(12) United States Patent
Rousseau et al.

(10) Patent No.: US 9,731,623 B2
(45) Date of Patent: Aug. 15, 2017

(54) SYSTEM FOR COOLING THE BATTERIES OF AN ELECTRIC OR HYBRID VEHICLE

(71) Applicant: Valeo Systemes Thermiques, Le Mesnil Saint Denis (FR)

(72) Inventors: Christophe Rousseau, Raizeux (FR); Bastien Jovet, Peisey-Nancroix (FR); Frederic Ladrech, Maurepas (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 221 days.

(21) Appl. No.: 14/542,982

(22) Filed: Nov. 17, 2014

(65) Prior Publication Data
US 2015/0135742 A1 May 21, 2015

(30) Foreign Application Priority Data

Nov. 18, 2013 (FR) ...................................... 13 61314

(51) Int. Cl.
| | |
|---|---|
| *F25D 17/02* | (2006.01) |
| *B60L 11/18* | (2006.01) |
| *B60H 1/00* | (2006.01) |
| *H01M 10/0525* | (2010.01) |
| *H01M 10/625* | (2014.01) |
| *H01M 10/663* | (2014.01) |
| *H01M 10/6568* | (2014.01) |
| *H01M 10/613* | (2014.01) |

(52) U.S. Cl.
CPC ...... *B60L 11/1874* (2013.01); *B60H 1/00278* (2013.01); *H01M 10/0525* (2013.01); *H01M 10/613* (2015.04); *H01M 10/625* (2015.04); *H01M 10/6568* (2015.04); *H01M 10/663* (2015.04); *B60H 2001/00307* (2013.01); *Y02E 60/122* (2013.01); *Y02T 10/7011* (2013.01)

(58) Field of Classification Search
CPC ............ B60L 11/1874; B60H 1/00278; B60H 2001/000307; B60H 2001/00928; Y02T 10/7005
See application file for complete search history.

(56) References Cited

U.S. PATENT DOCUMENTS

| | | | | |
|---|---|---|---|---|
| 2005/0167169 | A1* | 8/2005 | Gering | B60H 1/00278 237/12.3 B |
| 2012/0241129 | A1* | 9/2012 | Kohl | B60H 1/00278 165/58 |
| 2014/0216709 | A1* | 8/2014 | Smith | B60H 1/00642 165/287 |

* cited by examiner

*Primary Examiner* — Elizabeth Martin
(74) *Attorney, Agent, or Firm* — Howard & Howard Attorneys PLLC

(57) ABSTRACT

A liquid cooling circuit for a storage battery, with which a motor vehicle of the electric or hybrid type is equipped includes a main loop for the circulation of a heat transfer fluid, the main loop is connected to elements for cooling the storage battery, and a first bypass connects the main loop to an air cooling radiator, and a second bypass connecting the main loop to a heat exchanger intended to be connected to an air conditioning system with which the motor vehicle is equipped, so as to cool the heat transfer fluid by means of the radiator and/or the heat exchanger of the air conditioning system. The main loop is connected to the first bypass by way of a first progressive three-way valve, and the main loop is connected to the second bypass by way of a second progressive three-way valve.

9 Claims, 1 Drawing Sheet

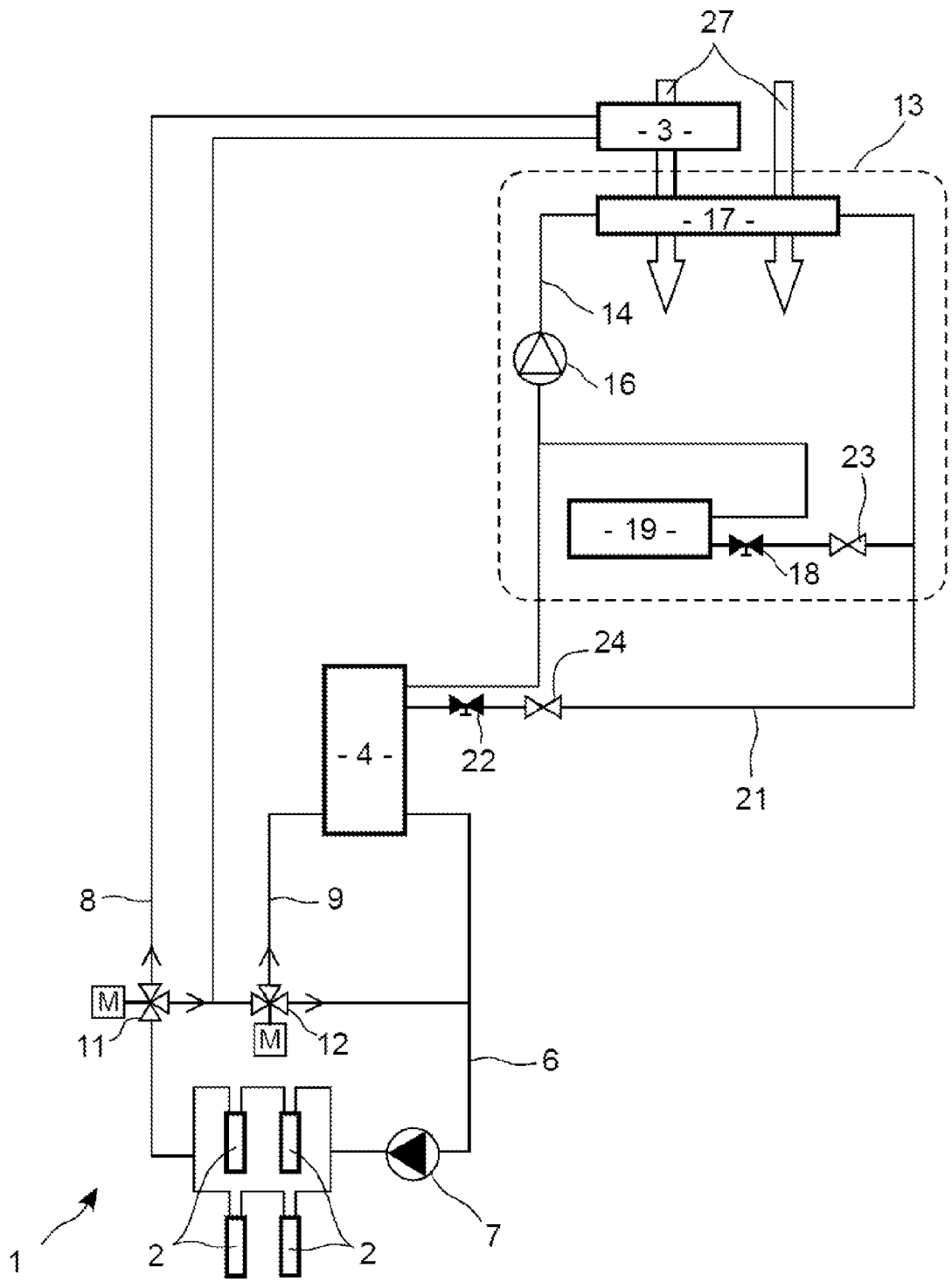

SYSTEM FOR COOLING THE BATTERIES OF AN ELECTRIC OR HYBRID VEHICLE

CROSS-REFERENCE TO RELATED APPLICATIONS

This application claims priority to and all the advantages of French Patent Application No. FR 13/61314, filed on Nov. 18, 2013, the content of which is incorporated herein by reference.

The invention relates to the cooling of the batteries of an electric or hybrid vehicle, the capacity and service life of which are linked to the quality of their thermal conditioning, such as lithium-ion batteries.

BACKGROUND OF THE INVENTION

In the field of electric or hybrid vehicles, it is necessary to cool the electrical energy storage batteries which heat up while they are charging or discharging, in order to improve the capacity and service life thereof.

This cooling is carried out by means of a heat transfer liquid which flows through the hollow cooling plates in contact with the battery or batteries or with the constituent cells thereof, so as to cool them by heat conduction.

The heat transfer liquid is cooled for example at a radiator which is itself cooled by the outside air, such that the heat generated at the batteries is discharged to the outside by way of a liquid cooling circuit.

The heat transfer liquid may also be cooled by flowing through an exchanger of the heat transfer liquid/coolant type, which is connected to the main air conditioning loop of the vehicle and through which all or part of the coolant of this loop also flows.

Nevertheless, these cooling modes lack precision and efficiency, and so they do not always allow the heat transfer liquid to be kept at a setpoint temperature with sufficient precision.

OBJECT OF THE INVENTION

The object of this invention is to propose a novel, more precise architecture for cooling the batteries of a vehicle.

SUMMARY OF THE INVENTION

To this end, a subject of the invention is a liquid cooling circuit for a storage battery of a motor vehicle of the electric or hybrid type, characterized in that it comprises a main loop for the circulation of a heat transfer fluid, said main loop being connected to elements for cooling the storage battery, and at least one bypass connecting the main loop to at least one air cooling radiator and/or to at least one heat exchanger intended to be connected to an air conditioning system with which the motor vehicle is equipped, so as to cool the heat transfer fluid by means of the radiator and/or the heat exchanger, each bypass being connected to the main loop by way of a flow rate controller that controls the flow rate in each bypass depending on the temperature of the heat transfer fluid.

If an exchanger or a radiator supplies an excessive cooling power of the heat transfer fluid with respect to the thermal constraints of the batteries, this architecture makes it possible to orient only a part of the flow toward this exchanger or this radiator and to divert the other part. Thus, the temperature of the heat transfer fluid intended for cooling the batteries does not drop below the desired limit temperature and this fluid flows in a continuous and stable manner through the architecture for cooling the batteries.

The invention also relates to a circuit as defined above, wherein each flow rate controller is a three-way progressive valve controlled by a control unit connected to a sensor for measuring the temperature of the heat transfer fluid.

The invention also relates to a circuit as defined above, comprising a first bypass connecting the main loop to the air cooling radiator, and a second bypass connecting the main loop to the heat exchanger, and wherein the first bypass and the second bypass are each connected to the main loop by a flow rate controller that controls the flow rate depending on the temperature of the heat transfer fluid.

The invention also relates to a circuit as defined above, wherein the heat exchanger intended to be connected to the air conditioning system is an evaporator for the fluid in the air conditioning system.

Preferably, the air conditioning system comprises a heat exchanger which is an evaporator for the fluid in the air conditioning system.

The invention also relates to a circuit as defined above, wherein the control unit comprises means for controlling the air conditioning system of the vehicle in order to increase or reduce the cooling power of this system.

According to a variant embodiment of the invention, the air conditioning system comprises a main loop comprising a compressor, a condenser, an expansion valve and an evaporator. The compressor forces the flow of a coolant fluid through this loop in order that it passes through the condenser before passing through the expansion valve and then the evaporator before reaching the compressor again. In this main loop of the air conditioning system, the coolant fluid thus carries out a thermodynamic cycle in which it discharges its heat at the condenser, and in which it picks up the heat at the evaporator.

Preferably, the main loop of the air conditioning system is connected to the heat exchanger by way of another bypass loop which is connected to the outlet of the condenser and to the inlet of the compressor. This bypass loop preferably comprises an expansion valve that the coolant fluid passes through before flowing through the heat exchanger in order then to return to the main loop of the air conditioning system, being reinjected at the inlet of the compressor.

According to one variant embodiment of the invention, the air conditioning system can comprise a flow rate controller for allowing or preventing the flow of coolant fluid through the expansion valve and through the evaporator.

Furthermore, according to another variant embodiment of the invention, the bypass loop connecting the main loop of the air conditioning system to the heat exchanger can comprise a flow rate controller for allowing or preventing the passage of coolant fluid through the expansion valve and through the exchanger.

Preferably, the first and the second bypass are arranged one after the other along the main loop. The flow rate controllers are thus actuated such that the heat transfer fluid is cooled successively in the radiator and in the exchanger.

Preferably, said flow rate controllers allow progressive control of said flow rate.

The present invention also relates to a method for controlling the liquid cooling circuit for a storage battery of a motor vehicle of the electric or hybrid type as described above, the liquid cooling circuit comprising:
  a heat exchanger intended to be connected to an air conditioning system with which the motor vehicle is equipped;

a control unit connected to a sensor for measuring the temperature of the heat transfer fluid and also a sensor for measuring the temperature of the outside air, the control unit comprising memory means;

characterized in that the following steps are carried out in succession:

a) a temperature value referred to as the setpoint value and another temperature value referred to as the threshold value are stored in the memory means;

b) the temperature of the heat transfer fluid and the temperature of the outside air are measured by the sensors;

c) the temperature of the heat transfer fluid and the setpoint value are compared by the control unit, a temperature value of for example between 3° C. and 5° C. being preferably added to or subtracted from the setpoint value before this comparison is carried out;

d.1) if the temperature of the heat transfer fluid is higher than the setpoint value, the temperature of the outside air and the threshold value are compared by the control unit, a temperature value of for example between 3° C. and 5° C. being preferably added to or subtracted from the threshold value before this comparison is carried out;

d.2) if the temperature of the outside air is lower than the threshold value, the control unit causes:

the opening of the flow rate controller of the heat exchanger to be progressively increased if the flow rate controller of the radiator is completely open;

the opening of the flow rate controller of the radiator to be progressively increased if the flow rate controller of the radiator is not completely open, preferably if the flow rate controller of the heat exchanger is completely closed;

d.3) if the temperature of the outside air is greater than or equal to the threshold value, the control unit causes the opening of the flow rate controller of the heat exchanger to be progressively increased and the flow rate controller of the radiator to be closed;

e.1) if the temperature of the heat transfer fluid is lower than the setpoint value, the control unit causes:

the opening of the flow rate controller of the radiator to be progressively decreased if the flow rate controller of the heat exchanger is completely closed and if the flow rate controller of the radiator is open;

the opening of the flow rate controller of the heat exchanger to be progressively decreased if the flow rate controller of the heat exchanger is open.

Preferably, when the requirement for cooling increases further, the control unit causes the air conditioning system to increase its cooling power so as to cool the heat transfer fluid sufficiently for it to reach the setpoint value.

The present invention will be better understood and other features and advantages will become apparent on reading the following detailed description which comprises embodiments which are given by way of illustration with reference to the appended single FIGURE, are presented by way of nonlimiting examples and which may serve to supplement the understanding of the present invention and the explanation of how it is embodied and, if need be, contribute to defining it.

BRIEF DESCRIPTION OF DRAWING

The single FIGURE schematically shows a liquid cooling circuit for a storage battery of a motor vehicle of the electric or hybrid type according to the invention.

DETAILED DESCRIPTION OF THE INVENTION

The circuit according to the invention which is shown in the single FIGURE and has the reference 1 cools the storage batteries (not shown) by means of a plurality of cooling plates 2 through which a heat transfer fluid flows. These cooling plates 2 are in contact with the storage batteries or the cells thereof in order to cool them by conduction.

This heat transfer fluid is kept at a temperature, the value of which is referred to as the setpoint value, by being cooled, depending on outside conditions, by a radiator 3 which is itself cooled by a flow of outside air, and/or by a heat exchanger 4 which is cooled by a circuit of an air conditioning system 13 with which the vehicle is equipped.

The actual cooling circuit comprises a main loop 6 comprising a pump 7 for forcing the flow of the heat transfer fluid through the cooling plates 2. This main loop 6 is connected on the one hand to the radiator 3 by way of a first bypass loop 8, and it is connected to the heat exchanger 4 by way of a second bypass loop 9.

This circuit comprises a first progressive three-way valve 11, by way of which the main loop 6 is in communication with the first bypass loop 8. When this valve 11 is completely open, all of the heat transfer fluid flowing through the main loop 6 also travels through the first bypass 8, such that it is then cooled in the radiator 3. By contrast, when this valve 11 is completely closed, there is no flow of heat transfer fluid through the first bypass loop 8.

This circuit comprises a second progressive three-way valve 12, by way of which the main loop 6 is in communication with the second bypass loop 9. When this second valve 12 is completely open, all of the heat transfer fluid flowing through the main loop 6 also travels through the second bypass 9, such that it is then cooled in the heat exchanger 4. By contrast, when this second valve 12 is completely closed, there is no flow of heat transfer fluid through the second bypass 9.

Thus, the first valve 11 is the valve for controlling the flow of heat transfer fluid through the radiator 3, while the second valve 12 is the one which makes it possible to control the flow of heat transfer fluid through the heat exchanger 4.

As can be seen in the single FIGURE, the heat exchanger 4, which is of the heat transfer fluid/coolant type and which is connected to the second bypass 9, is also connected to an air conditioning system 13 with which the motor vehicle is also equipped. Thus, the heat exchanger 4 makes it possible to cool the heat transfer fluid by virtue of the cold produced by the air conditioning system 13.

This air conditioning system 13 comprises a main loop 14 comprising a compressor 16 that forces the flow of coolant fluid through this loop 14 such that it passes through a condenser 17 before passing through an expansion valve 18 and then an evaporator 19 before reaching the compressor 16 again. In this main loop, the coolant fluid thus carries out a thermodynamic cycle in which it discharges its heat at the condenser 17 and in which it picks up the heat at the evaporator 19.

This main loop 14 is connected to the heat exchanger 4 by way of another bypass loop 21 which is connected to the outlet of the condenser 17 and at the inlet of the compressor 16. This bypass loop 21 comprises an expansion valve 22 that the coolant fluid passes through before flowing through the heat exchanger 4 in order then to return to the main loop, being reinjected at the inlet of the compressor 16.

In addition, the air conditioning system 13 comprises a valve 23 for allowing or preventing the flow of coolant fluid through the expansion valve 18 and through the evaporator 19. The bypass loop 21 comprises a valve 24 for allowing or preventing the passage of coolant fluid through the expansion valve 22 and through the exchanger 4.

Thus, when the air conditioning system 13 is in operation, all or part of the coolant fluid of this system 13 can be diverted toward the heat exchanger 4 so as to cool the heat transfer fluid flowing through the circuit 1 for cooling the batteries.

A control unit (not shown) is connected to the circuit 1 and to the system 13 by way of different sensors and it is also connected to the three-way progressive valves 11 and 12 in order to control them so as to cool the heat transfer fluid in order to keep it at its setpoint temperature.

Furthermore, the radiator 3 and the condenser 17 are subjected to a flow of cooling air which is depicted by the arrows 27 and by virtue of which, firstly the radiator 3 cools the heat transfer fluid flowing through this radiator 3, and secondly the condenser 17 can discharge the heat from the coolant fluid of the air conditioning system 13.

As is visible in the single FIGURE, the first bypass 8 and the second bypass 9 are arranged one after the other along the main loop 6. The valves 11 and 12 can then be actuated so that the heat transfer fluid is cooled successively in the radiator 3 and in the exchanger 4.

The method for controlling the liquid cooling circuit 1 comprises a selection of opening and closing the valves 11, 12 depending in particular on the cooling requirement of the batteries.

Thus, when the cooling requirement of the batteries is relatively low and the temperature of the outside air is sufficiently cold, the valve 12 of the heat exchanger 4 is closed such that the heat transfer fluid cannot pass through the heat exchanger 4, and the valve 11 of the radiator 3 is opened to a greater or lesser extent in order to keep the heat transfer fluid at its setpoint temperature.

This control is carried out by the control unit (not shown) which is connected to a sensor for measuring the temperature of the heat transfer fluid and which increases the opening of the valve 11 if the temperature measured is higher than the setpoint value, and which decreases this opening when the temperature measured is lower than the setpoint value.

By contrast, when the cooling requirement is greater, that is to say when the valve 11 of the radiator 3 is completely open but the temperature of the heat transfer fluid remains higher than the setpoint temperature, the valve 12 associated with the exchanger 4 is actuated to open so as to cause all or some of the heat transfer fluid which has been cooled by the radiator 3 to pass through the heat exchanger 4.

In this case, the air conditioning system 13 is started up so as to carry out all or part of the cooling of the heat transfer fluid. Specifically, the air conditioning system 13 may have been started beforehand by the occupants of the passenger compartment of the vehicle seeking to lower the temperature in the passenger compartment. Otherwise, the air conditioning system 13 is put into operation by the control unit (not shown) which also controls the valves 23 and 24 in order to ensure that coolant fluid flows effectively through the heat exchanger 4.

The heat transfer fluid is then cooled in the heat exchanger 4 by the coolant fluid of the air conditioning system 13 which also flows through this exchanger 4, thereby making it possible to significantly increase the cooling power so as to allow the heat transfer fluid to be kept at its setpoint temperature.

The progressive valve 11 of the radiator 3 is then completely open and the progressive valve 12 of the exchanger 4 is slaved to the temperature of the heat transfer fluid so as to keep it at its setpoint temperature.

In this configuration, it is also possible to reduce or even close the opening of the valve 11 of the radiator 3, in particular if the outside temperature is higher than the temperature of the heat transfer fluid entering the radiator 3, that is to say when the operating conditions do not allow the radiator 3 to cool the heat transfer fluid.

When the cooling requirement increases further, the control unit (not shown) controls the air conditioning system 13 such that it increases its cooling power, so as to cool the heat transfer fluid sufficiently for it to reach the setpoint temperature.

Thus, in this situation, the valve 12 of the heat exchanger 4 is completely open so that all of the flow of heat transfer fluid passes through the heat exchanger 4, and the controlling of the air conditioning system 13 by the control unit is slaved to the temperature of the heat transfer fluid.

In the example illustrated in the single FIGURE, the circuit 1 comprises two separate bypasses 8, 9 that are fed respectively by two three-way progressive valves 11, 12 that are controlled by a control unit, but simpler solutions may also be envisioned within the scope of the invention.

Thus, one and/or the other of the progressive three-way valves 11 and 12 may be replaced by one or more flow rate controllers of the thermostat type or the like. Such controllers make it possible to progressively increase the flow rate through each bypass in the case of an increase in the temperature of the heat transfer fluid and vice versa, in a passive manner, that is to say without it being necessary to provide a dedicated control unit with an associated heat sensor.

The architecture of the circuit can also be simplified by providing, for example, rather than two separate bypasses that are dedicated to the heat exchanger of the heat transfer fluid/air type and to the heat exchanger of the heat transfer fluid/coolant type, respectively, but a single progressive bypass for distributing the flow of heat transfer fluid between the heat exchanger of the heat transfer fluid/air type and the heat exchanger of the heat transfer fluid/coolant type. This single bypass is then connected to the main loop by a controller for controlling the distribution of the flow between the two circuits depending on the temperature of the fluid.

The invention claimed is:

1. A method for controlling a liquid cooling circuit for a storage battery of an electric or hybrid motor vehicle, the liquid cooling circuit comprising: a main loop for the circulation of a heat transfer fluid, the main loop being connected to elements for cooling the storage battery, and a first bypass and a second bypass connecting the main loop to at least one air cooling radiator and/or to at least one heat exchanger configured to be connected to an air conditioning system with which the motor vehicle is equipped, so as to cool the heat transfer fluid by the radiator and/or the heat exchanger, each of the first bypass and the second bypass being connected to the main loop by way of at least a first flow rate controller and a second flow rate controller that controls the flow rate in each of the first bypass and the second bypass, respectively, depending on the temperature of the heat transfer fluid, wherein the first flow rate controller and the second flow rate controller are disposed one directly following the other along the main loop, the liquid cooling circuit further comprising a heat exchanger configured to be connected to an air conditioning system with which the motor vehicle is equipped; and a control unit connected to a sensor for measuring the temperature of the heat transfer fluid and a sensor for measuring the temperature of the outside air;

the method comprising:

a) storing a setpoint value temperature value and a threshold value temperature value in the control unit;

b) subsequently measuring the temperature of the heat transfer fluid and the temperature of the outside air by the sensors;

c) subsequently comparing the temperature of the heat transfer fluid and the setpoint value temperature value using the control unit;

d.1) when the temperature of the heat transfer fluid is higher than the setpoint value temperature value, the temperature of the outside air and the threshold value temperature value are compared using the control unit, d.2) when the temperature of the outside air is lower than the threshold value temperature value, the control unit is used to cause:

the opening of the second flow rate controller of the heat exchanger to be progressively increased when the first flow rate controller of the radiator is completely open, the opening of the first flow rate controller of the radiator to be progressively increased when the first flow rate controller of the radiator is not completely open, d.3) when the temperature of the outside air is greater than or equal to the threshold value temperature value, the control unit is used to cause the opening of the second flow rate controller of the heat exchanger to be progressively increased and the first flow rate controller of the radiator to be closed, d.4) when the temperature of the heat transfer fluid is lower than the setpoint value temperature value, the control unit is used to cause:

the opening of the first flow rate controller of the radiator to be progressively decreased when the second flow rate controller of the heat exchanger is completely closed and when the first flow rate controller of the radiator is open, then using the control unit is used to cause the opening of the second flow rate controller of the heat exchanger to be progressively decreased when the second flow rate controller of the heat exchanger is open.

2. The circuit according to claim 1, wherein each of the first flow rate controller and the second flow rate controller is a three-way progressive valve controlled by a control unit connected to a sensor for measuring the temperature of the heat transfer fluid.

3. The circuit according to claim 2, wherein the control unit comprises a valve for increasing or reducing the cooling power of this system.

4. The circuit according to claim 2, comprising the first bypass connecting the main loop to the air cooling radiator, and the second bypass connecting the main loop to the heat exchanger, and wherein the first bypass and the second bypass are each connected to the main loop by the at least first flow rate controller and the second flow rate controller that controls the flow rate depending on the temperature of the heat transfer fluid.

5. The circuit according to claim 3, comprising the first bypass connecting the main loop to the air cooling radiator, and the second bypass connecting the main loop to the heat exchanger, and wherein the first bypass and the second bypass are each connected to the main loop by the at least first flow rate controller and the second flow rate controller that controls the flow rate depending on the temperature of the heat transfer fluid.

6. The circuit according to claim 1, comprising the first bypass connecting the main loop to the air cooling radiator, and the second bypass connecting the main loop to the heat exchanger, and wherein the first bypass and the second bypass are each connected to the main loop by the at least first flow rate controller and the second flow rate controller that controls the flow rate depending on the temperature of the heat transfer fluid.

7. The circuit according to claim 1, wherein the heat exchanger configured to be connected to the air conditioning system is an evaporator for the fluid in the air conditioning system.

8. The circuit according to claim 1, wherein the air conditioning system comprises a heat exchanger which is an evaporator for the fluid in the air conditioning system.

9. The circuit according to claim 1, wherein the at least first flow rate controller and the second flow rate controller allow progressive control of said flow rate.

* * * * *